(12) United States Patent
Takimoto et al.

(10) Patent No.: US 9,849,783 B2
(45) Date of Patent: Dec. 26, 2017

(54) DISPLAY CONTROL APPARATUS, METER SYSTEM, AND DISPLAY CONTROL METHOD

(71) Applicant: MITSUBISHI ELECTRIC CORPORATION, Tokyo (JP)

(72) Inventors: Yasuaki Takimoto, Tokyo (JP); Masami Aikawa, Tokyo (JP); Takehisa Mizuguchi, Tokyo (JP); Yoshihiko Mori, Tokyo (JP); Takeshi Mitsui, Tokyo (JP); Masakazu Okuda, Tokyo (JP); Mitsuru Sakai, Tokyo (JP); Masahiro Kosakada, Tokyo (JP); Satoshi Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/030,778

(22) PCT Filed: Nov. 15, 2013

(86) PCT No.: PCT/JP2013/080906
§ 371 (c)(1),
(2) Date: Apr. 20, 2016

(87) PCT Pub. No.: WO2015/072012
PCT Pub. Date: May 21, 2015

(65) Prior Publication Data
US 2016/0250925 A1 Sep. 1, 2016

(51) Int. Cl.
*G09G 5/00* (2006.01)
*G06F 3/038* (2013.01)
*B60K 35/00* (2006.01)
*G01D 7/00* (2006.01)
*G09G 5/10* (2006.01)

(52) U.S. Cl.
CPC ............... *B60K 35/00* (2013.01); *G01D 7/00* (2013.01); *G09G 5/10* (2013.01); *G09G 2340/14* (2013.01); *G09G 2360/144* (2013.01); *G09G 2380/10* (2013.01)

(58) Field of Classification Search
CPC .................................................... B60K 35/00
See application file for complete search history.

(56) References Cited

U.S. PATENT DOCUMENTS

| | | | |
|---|---|---|---|
| 2005/0168330 A1 | 8/2005 | Ono et al. | |
| 2006/0092001 A1* | 5/2006 | Yokota | B60K 35/00 340/425.5 |
| 2008/0042821 A1* | 2/2008 | Kaya | B60K 35/00 340/459 |
| 2012/0223964 A1* | 9/2012 | Oishi | B60K 35/00 345/629 |

FOREIGN PATENT DOCUMENTS

| | | |
|---|---|---|
| JP | 11-20507 A | 1/1999 |
| JP | 2005-241627 A | 9/2005 |
| JP | 2006-132950 A | 5/2006 |
| JP | 2007-57274 A | 3/2007 |

\* cited by examiner

*Primary Examiner* — Nan-Ying Yang
(74) *Attorney, Agent, or Firm* — Birch, Stewart, Kolasch & Birch, LLP (57) ABSTRACT

There is provided a renderer 5 that renders a graphics indicator 7b (or 7f) which is displayed on a display screen 7a of a display 7 and which indicates an indication value in synchronization with a short hand 8a.

7 Claims, 7 Drawing Sheets

DISPLAY CONTROL APPARATUS, METER SYSTEM, AND DISPLAY CONTROL METHOD

TECHNICAL FIELD

The present invention relates to a display control apparatus that presents a meter in which a mechanical operating portion works with graphics display, a meter system, and a display control method.

BACKGROUND ART

For example, a vehicle display apparatus described in Patent Document 1 is provided with a mechanical meter frame (display partition member) so as to surround a display region where a graphics meter image is displayed.

The meter frame has a mobile mechanism. When the display position of the meter image is moved on a screen, the meter frame also moves in conjunction with the meter image such that the meter image is always displayed within the frame.

CITATION LIST

Patent Document

Patent Document 1: JP 2006-132950 A

SUMMARY OF THE INVENTION

Problems to be Solved by the Invention

In recent years, for an instrument panel (hereinafter, abbreviated as in-pane) which is used as a vehicle dashboard, a so-called integrated instrumental panel has been developed that lays out and displays images of meters and the like, navigation information, in-vehicle camera shot videos, and so on, on one display screen.

In the integrated instrumental panel, when indication portions of the meters and the like are all displayed using images as in Patent Document 1, if trouble occurs in the display due to abnormality in the display screen, a driver cannot know a state of the vehicle indicated by the meters, and thus, there is a problem in terms of safe driving.

Meanwhile, when the integrated instrumental panel employs conventional mechanical meters and the like, the inconvenience of not being able to know a state of the vehicle due to abnormality in the display screen can be avoided and thus reliability improves. On the other hand, in the case of mechanical meters and the like, fixed installation space is required, and basically display information other than the meters cannot be disposed in the installation space. Therefore, a characteristic of the display screen that a display screen layout can be changed freely cannot be effectively utilized.

Here, it is also considered to miniaturize the mechanical meters to increase the space of the display screen. However, simply miniaturizing the meters always decreases the visibility of the meters, and accordingly, a possibility is considered that required information cannot be obtained when required.

The present invention is made to solve problems such as those described above, and an object of the invention is to obtain a display control apparatus, a meter system, and a display control method that are capable of effectively utilizing a display screen by taking advantage of a characteristic of the display screen that a display screen layout can be changed freely, while ensuring a highly-reliable indication function by using a mechanical meter.

Means for Solving the Problems

A display control apparatus according to the invention is a display control apparatus that controls display of a display having a display screen disposed on a back of a meter, the meter having a mechanically driven pointer. The display control apparatus includes: a renderer that renders a graphics indicator indicating an indication value of the meter in synchronization with the pointer, the graphics indicator being displayed on the display screen of the display; a switching determiner that determines vehicle status based on an output from an input apparatus which is a sensor that detects a state of a vehicle, etc., or a sensor that detects a driver's input instruction (hereinafter, referred to as a sensor), to determine a rendering mode of the display screen; a display time estimator that estimates a display time at which the graphics indicator is displayed; and a hand position estimator that estimates a position of the pointer for the display time estimated by the display time estimator. The renderer changes a display mode of the graphics indicator displayed on the display screen, according to the rendering mode determined by the switching determiner, and renders the graphics indicator in synchronization with the position of the pointer estimated by the hand position estimator.

Effect of the Invention

According to the present invention, there is an advantageous effect that a display screen can be effectively utilized by allowing display content of the display screen to have flexibility, while a highly-reliable indication function of a mechanical meter is ensured.

MODES FOR CARRYING OUT THE INVENTION

In order to describe the present invention in more detail, modes for carrying out the invention will be described below with reference to the accompanying drawings.

First Embodiment

Figure 1:
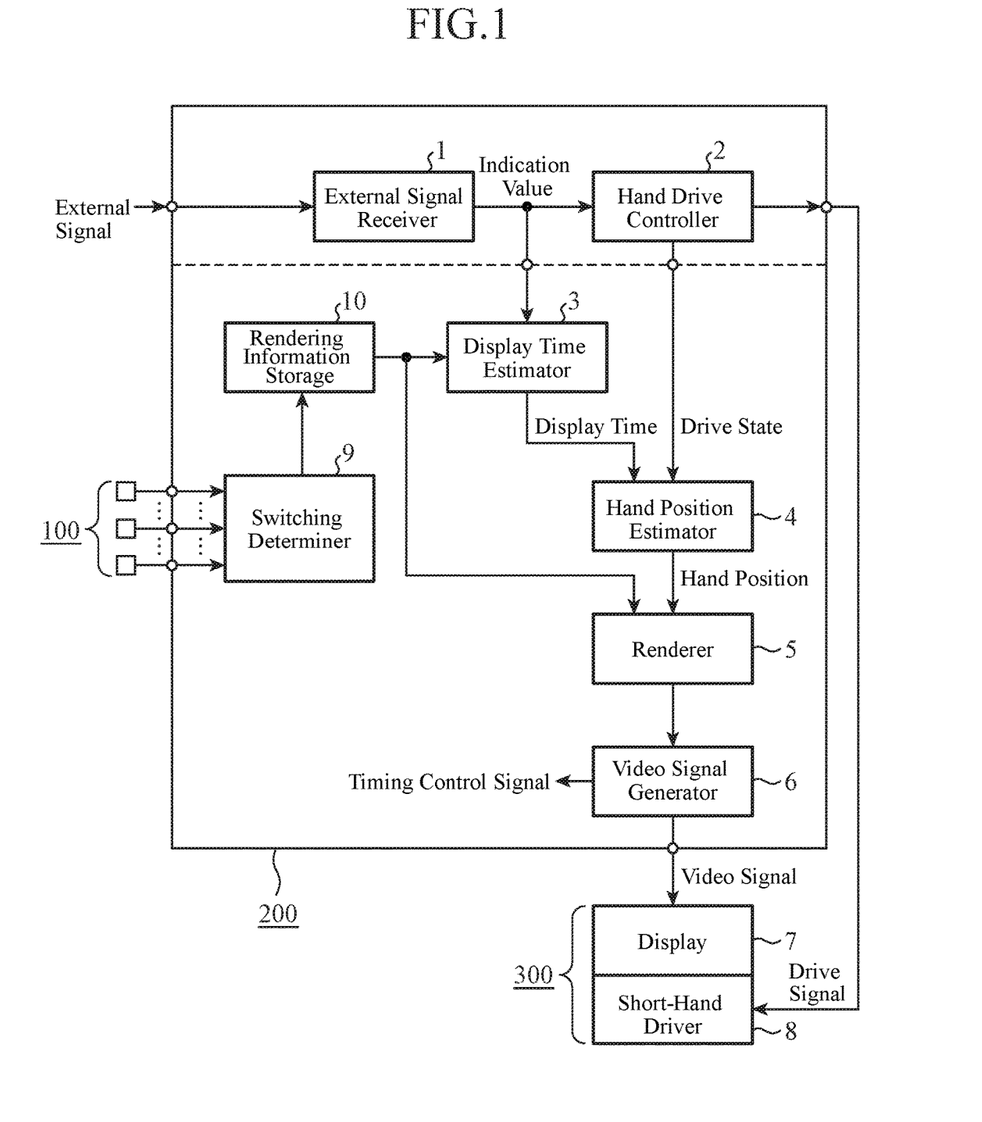
FIG. 1 is a block diagram showing a configuration of a meter system according to a first embodiment of the invention.

FIG. 1 is a block diagram showing a configuration of a meter system according to a first embodiment of the present invention. In addition, FIGS. 2(a) to 2(c) are diagrams showing examples of a change in a display screen of the first embodiment of the invention.

The meter system shown in FIG. 1 is a system that allows a meter indicating a state of a vehicle, e.g., vehicle speed, to operate. In the first embodiment, as shown in FIGS. 2(a) to 2(c), the meter is composed of a short hand 8a and a display screen 7a disposed on the back of the short hand 8a.

Figure 2:
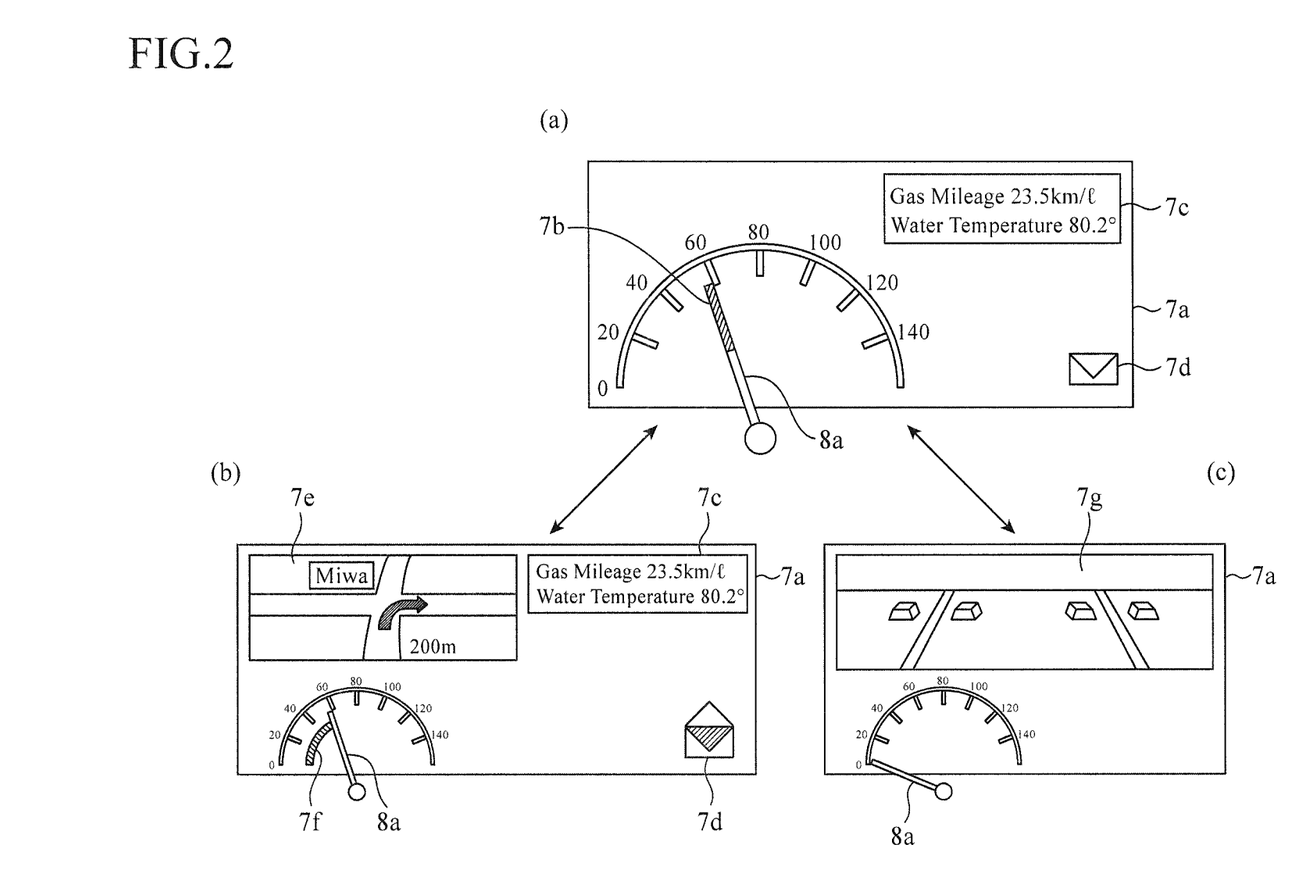
FIGS. 2(a) to 2(c) are diagrams showing examples of a change in a display screen of the first embodiment of the invention.

In FIG. 2(a), the meter is composed of a mechanical pointer and a pointer rendered on a display screen. Here, the mechanical pointer uses the short hand 8a which is shorter than a hand normally used for speedometers, etc. In addition, a portion of the hand shortened because of the short hand is made up for by a pointer 7b rendered on the display screen. By allowing the short hand 8a and the pointer 7b to rotate in conjunction with each other, a meter of normally used size is formed. Thus, the meter used in the drawing has size equivalent to that of a generally used meter, and occupies a wide range on the display screen 7a and is displayed in an easily visible manner. In addition, the example shows that the display screen 7a displays, in addition to the meter, information 7c obtained from the vehicle, such as gas mileage, water temperature, mileage as a tripmeter, and accumulated mileage as an odometer, and information 7d obtained from an external source of the vehicle via a communication line or the like, e.g., mail information.

FIG. 2(b) shows an example of display for when the pointer 7b rendered on the display screen 7a is disappeared to reduce the size of a meter frame. This is a state in which guidance is being given by a navigation apparatus. For example, when guidance instructing to turn right at the Miwa intersection is displayed, the meter is reduced in size and displayed, and a guidance screen of the navigation apparatus is displayed in open space. Note that at this time the meter presents information only by the mechanical short hand 8a, and thus, in order to improve the visibility of the short hand, graphics that display a rotation path in a belt-like manner, specifically, a belt-like display 7f whose start point is 0 km/h and end point is the mechanical short hand 8a, may be supplementarily added thereto. Note that in FIG. 2(b) an icon indicating that a mail has been opened is displayed.

FIG. 2(c) shows an example of a state in which the vehicle is in reverse gear. At this time, as in the case of FIG. 2(b), the meter is reduced in size and displayed, and video information 7g obtained from a rear view camera which is provided separately is displayed on the whole display screen 7a to ensure safety. At this time, it is preferred that at least one of the information 7c and the information 7d which are unnecessary information for backing up be made disappear to accordingly save display space for the rear view camera. Note that, since the meter presenting speed is not necessary for backing up, it is considered to also disappear the rendering of the meter (a frame line, the pointer 7b, and the belt-like display 7f), to display the video information of the rear view camera on the entire display screen 7a.

The first embodiment is based on technical ideas such as those described above, and is to achieve both: the maintaining of high reliability of the meter's indication function by determining a driving situation and providing display content appropriate to the driving situation; and the effective utilization of a display screen by allowing display content to have flexibility. How the display content shown in FIGS. 2(a) to 2(c) is implemented will be specifically described below.

Note that the reason that the high reliability of the meter's indication function can be maintained here is because the meter's indication function is presented by the mechanically driven short hand 8a.

Namely, since the short hand 8a operates independently of the display of the display screen 7a, even if display of the pointer 7b or the belt-like display 7f (hereinafter, collectively referred to as a graphics indicator) which is displayed on the display screen 7a cannot be performed due to the occurrence of abnormality in the display screen 7a, a driver can grasp a rough meter indication value from the short hand 8a.

When the above-described meter is allowed to operate, the display screen 7a displays, as shown in FIGS. 2(a) and 2(b), the graphics indicators 7b and 7f that indicate an indication value by operating integrally with the short hand 8a. The graphics indicator 7b of FIG. 2(a) is hand-like graphics extending from an end of the short hand 8a. The graphics indicator 7b indicates an indication value by operating integrally with the short hand 8a. By this, the same visibility as that of a conventional mechanical meter with a long hand can be ensured.

On the other hand, since rendering of the graphics indicator 7b requires a predetermined amount of time, there is a possibility that a lag may occur with the operation of the mechanical short hand 8a which operates continuously. Accordingly, a feeling of strangeness may be given to the driver. Thus, in the first embodiment, the graphics indicator 7b is displayed on the display screen 7a taking into account the amount of time required to render the graphics indicator 7b, by which the feeling of strangeness given to the driver is suppressed.

The graphics indicator 7f of FIG. 2(b) is graphics that indicate an indication value by operating integrally with the short hand 8a and displaying a rotation state of the short hand 8a in a belt-like manner. Since the indication value of the meter is displayed in a belt-like numerical value range, even if the meter is reduced in size, visibility can be improved compared to the case in which an indication value is pinpointed by a pointer. In addition, in a portion of the display screen 7a other than the rotation range of the short hand 8a, information can be displayed without being blocked by the short hand 8a. Thus, it is also possible to effectively utilize the display screen 7a.

Note that in the invention any graphics indicator may be used as long as the graphics indicator indicates an indication value by operating integrally with the short hand 8a. Thus, they are not limited to those shown in FIGS. 2(a) and 2(b).

In addition, as shown in FIG. 1, the meter system is composed of sensors 100 for grasping vehicle status; a display control apparatus 200 that controls display of a display according to the vehicle status; and an information presentation apparatus 300 that presents information in response to an instruction from the display control apparatus 200. Here, the information presentation apparatus 300 includes a short-hand driver including the short hand 8a and a driver that drives the short hand 8a.

Note that in the first embodiment the display control apparatus 200 uses, as an external signal receiver 1 and a hand drive controller 2, those that are originally included in a conventional mechanical meter, and thus, the display control apparatus 200 does not necessarily need to include the external signal receiver 1 and the hand drive controller 2.

The display control apparatus 200 includes a display time estimator 3, a hand position estimator 4, a renderer 5, a video signal generator 6, a switching determiner 9, and a rendering information storage 10.

The external signal receiver 1 receives an external signal indicating a state of the vehicle, as a signal for indicating by the above-described analog meter. The "external" as used herein refers to external to the display control apparatus 200. For the external signal, for example, a vehicle speed signal or the like is input through a CAN (Controller Area Network) bus. The external signal receiver 1 outputs an indication value which is a value to be indicated by the meter, based on the received vehicle speed signal or the like.

The hand drive controller 2 generates and outputs a drive signal for a motor that allows the pointer to rotate, based on the indication value input from the external signal receiver 1. In addition, the hand drive controller 2 outputs a current position of the short hand 8a and a rotational speed including positive and negative directions, as a current drive state, to the hand position estimator 4.

The display time estimator 3, the hand position estimator 4, and the renderer 5 are to render the graphics indicator in synchronization with the short hand 8a which changes every moment. A predetermined amount of time is required to display rendering information including a graphics indicator on the display screen 7a. This causes a delay in rendering. Thus, if rendering is performed as it is, then synchronization is not achieved between the graphics indicator and the short hand 8a, which may cause a lag. Hence, the display time estimator 3, the hand position estimator 4, and the renderer 5 estimate an amount of time required to display rendering information including the graphics indicator on the display screen 7a, and compute a display time. Then, a position of the short hand 8a for the display time is estimated, and the rendering information including the graphics indicator is displayed in accordance with the estimated one, by which it is devised to achieve synchronization between the graphics indicator and the short hand 8a.

A specific description will be made below. The display time estimator 3 accepts, as input, rendering information indicating content to be rendered in graphics on the display screen 7a, from the rendering information storage 10 which will be described later, and estimates, based on the rendering information, rendering time during which the rendering information including the graphics indicator is rendered in a VRAM (Video Random Access Memory). Furthermore, the display time estimator 3 estimates, using the rendering time, a display time at which the rendered rendering information including the graphics indicator is displayed on the screen of the display 7. In this manner, the display time estimator 3 estimates a time at which the rendering information including the graphics indicator is displayed on the screen of the display 7, and outputs the time as the display time to the hand position estimator 4. In addition, since the rendering time may vary depending on the position of the pointer, the display time estimator 3 accepts, as input, and uses the indication value as a tentative value.

Based on the current drive state of the short hand input from the hand drive controller 2, and the display time estimated by the display time estimator 3, the hand position estimator 4 estimates the position of the short hand 8a for the display time.

The renderer 5 performs rendering such that the graphics indicator is synchronized with the position of the short hand 8a estimated by the hand position estimator 4. Specifically, the renderer 5 determines a display mode of the graphics indicator, including a meter frame, according to the rendering information, and performs rendering in the VRAM such that the graphics indicator is displayed in synchronization with the estimated position of the short hand 8a.

The video signal generator 6 reads the graphics rendered by the renderer 5 from the VRAM, and outputs the graphics as a video signal to the display 7. In addition, the video signal generator 6 generates a timing control signal for each display start time of each frame of the video signal which will be described later, and outputs the timing control signal to the external signal receiver 1, the hand drive controller 2, the display time estimator 3, the hand position estimator 4, the renderer 5, the switching determiner 9, and the rendering information storage 10. These components determine their respective operation timings with reference to the timing control signal input from the video signal generator 6.

The display 7 is a display having the display screen 7a disposed on the back of the short hand 8a, and is, for example, the one disposed in an instrumental panel portion in front of a driver's seat.

The short-hand driver 8 indicates a mechanical operating portion including the short hand 8a. For example, the short-hand driver 8 is composed of, in addition to the short hand 8a, a motor that allows the short hand 8a to be mechanically driven according to the drive signal output from the hand drive controller 2; a transmission mechanism for transmitting driving force of the motor to the short hand 8a; and the like.

By the above-described configuration, rendering information including the graphics indicator can be displayed in synchronization with the position of the short hand 8a for the display time.

On the other hand, the mode of the rendering information rendered on the display screen 7a needs to be changed in the manner shown in FIGS. 2(a) to 2(c), according to the vehicle status.

Hence, the switching determiner 9 determines vehicle status based on at least one of information on the vehicle which is output from the sensors 100 and information obtained from an external source of the vehicle. It is determined, based on the determination, for example, which one of those shown in FIGS. 2(a) to 2(c) is used as a display mode to be rendered, and provides the determined display mode to the rendering information storage 10. The rendering information storage 10 has stored therein the information to be rendered on the display screen 7a. The rendering information storage 10 provides the rendering information of the display mode instructed by the switching determiner 9, to the renderer 5. By this, the display mode of the display screen 7a can be switched according to the vehicle status.

Note that in the above description the information on the vehicle may also be obtained through the above-described CAN bus. In addition, it is also possible to include, in the sensors 100, a communication apparatus that communicates with the external source of the vehicle, to also quote information obtained from an external cloud, etc., for the determination of the vehicle status. For example, when the fact that the vehicle is stuck in a traffic jam is grasped from the information sent from the external cloud, since a speedometer does not give so important information, it is also possible to display the speedometer in a reduced-size manner and display other information on the display screen. The information obtained from the sensors 100 can be used not only for the determination of the vehicle status, but also as information which is additionally displayed on the display screen.

Note that the above-described external signal receiver 1, hand drive controller 2, display time estimator 3, hand position estimator 4, renderer 5, video signal generator 6, switching determiner 9, and rendering information storage 10 can be implemented as specific means where hardware and software cooperate with each other, by a microcomputer executing, using a peripheral device such as a RAM, a program having described therein processes specific to the embodiment and stored in a storage apparatus such as a ROM.

Next, the operation will be described.

Figure 3:
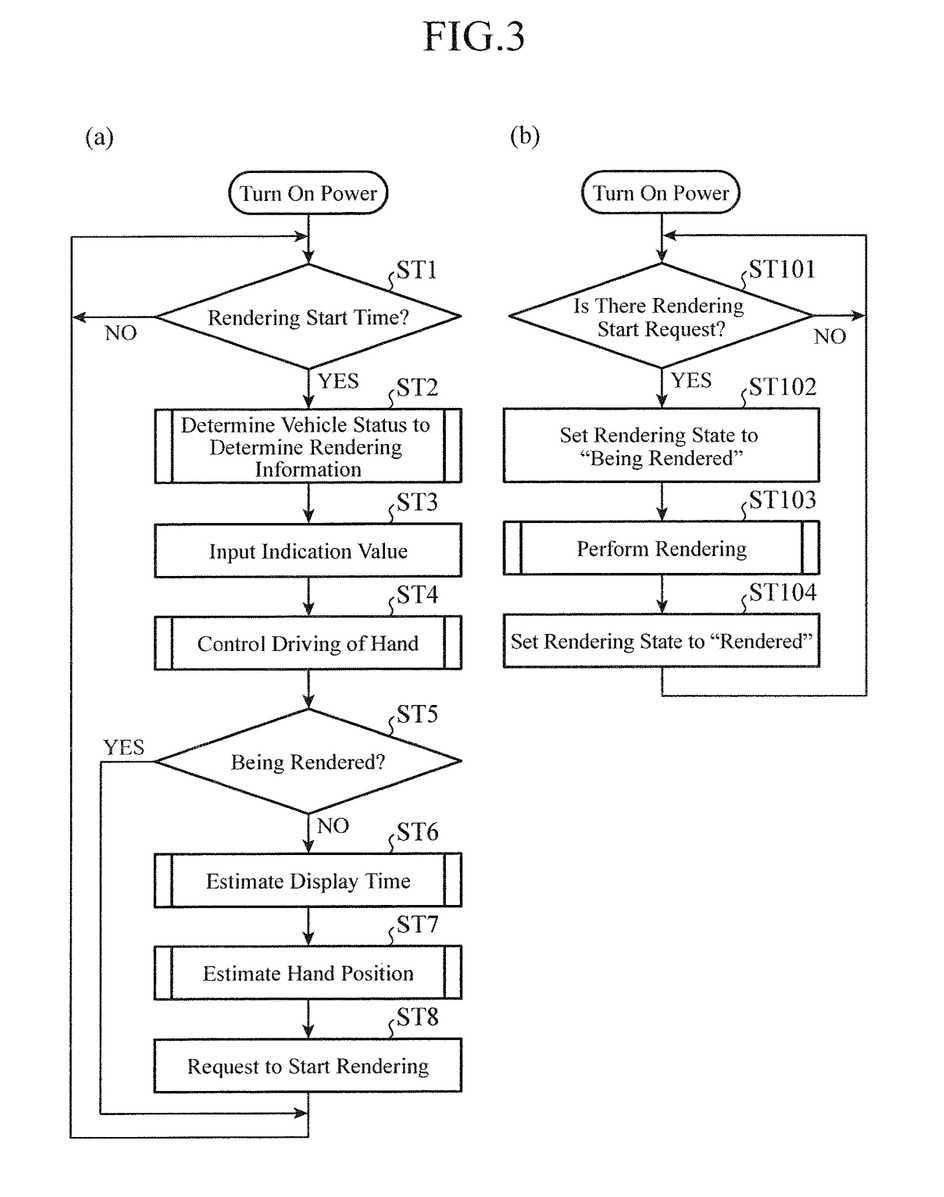
FIGS. 3(a) and 3(b) are flowcharts showing a display control method according to the first embodiment of the invention.

FIGS. 3(a) and 3(b) are flowcharts showing a display control method according to the first embodiment. In the display control method of the first embodiment, in FIG. 3(a), when a rendering start time has come, rendering content including the rendering mode is determined based on vehicle status, and a start of rendering of the rendering content to be rendered at the display time is instructed. Likewise, in FIG. 3(b), in response to a request to start rendering by the flowchart of FIG. 3(a), the rendering is performed.

In FIG. 3(a), at step ST1, the timing control signal output from the video signal generator 6 is captured, and processes from step ST2 to step ST8 are activated for each display cycle T. Here, timing at which the timing control signal occurs is synchronized with a rendering start time shown in FIG. 5 which will be described later.

First, when power is turned on, it is determined whether it is the rendering start time. Here, if it is not the rendering start time, it is determined to be NO and the apparatus is placed in a standby state until the rendering start time has come (step ST1). If the rendering start time has come and thus it is determined to be YES at step ST1, processing proceeds to step ST2, and the vehicle status is determined to determine the rendering information (step ST2). Specifically, the information is acquired from the sensors 100, and it is determined, based on the acquired information, which one of the above-described display modes shown in FIGS. 2(a) to 2(c) is desirable. A result of the determination is sent to the rendering information storage 10, and the rendering information generated according to the display mode is output to the renderer 5 from the rendering information storage 10 (step ST2). At step ST3, the external signal receiver 1 accepts, as input, an indication value to be indicated by the meter, and outputs the indication value to the hand drive controller 2 and the display time estimator 3 (step ST3).

The hand drive controller 2 accepts, as input, the indication value output from the external signal receiver 1, and generates a drive signal based on the indication value to drive the short hand 8a (step ST4). Putting aside the flowchart for now, an internal configuration and hand drive control of the hand drive controller 2 will be described in detail.

Figure 4:
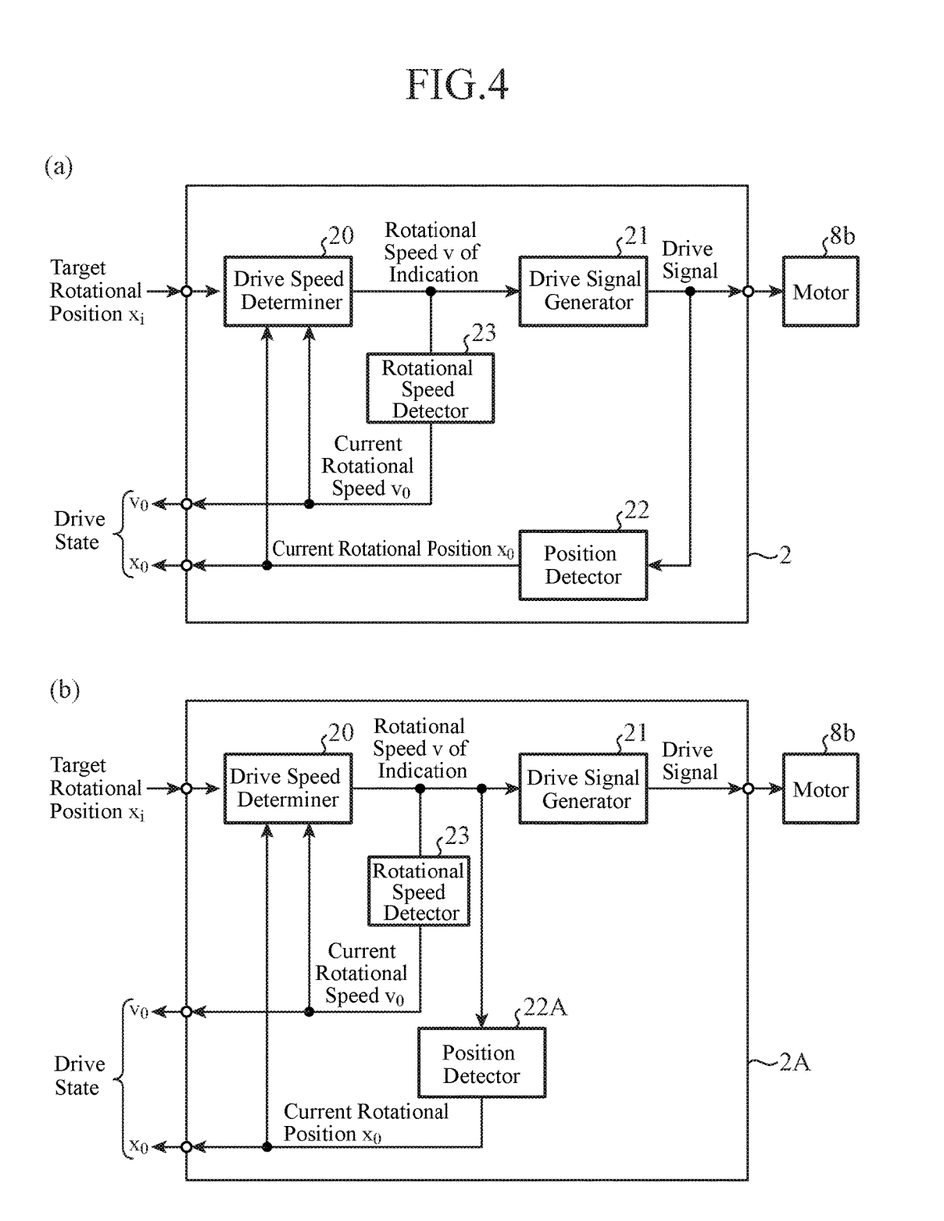
FIGS. 4(a) and 4(b) are block diagrams showing examples of a configuration of a hand drive controller of the first embodiment of the invention.

FIGS. 4(a) and 4(b) are block diagrams showing examples of a configuration of the hand drive controller. FIG. 4(a) shows a configuration in which the drive signal is used to detect a current rotational position of the short hand 8a, and FIG. 4(b) shows a configuration in which an indication speed is used to detect a current rotational position of the short hand 8a.

The hand drive controller 2 accepts, as input, a target rotational position $x_i$ as the indication value output from the external signal receiver 1, and generates a drive signal based on the indication value and outputs the drive signal to a motor 8b, and thereby drives the short hand 8a. In addition, the hand drive controller 2 outputs a current rotational position $x_0$ and a current rotational speed $v_0$ of the short hand 8a, as a drive state, to the hand position estimator 4.

Thereafter, it is assumed that the hand drive controller 2, 2A receives the timing control signal output from the video signal generator 6, by which operation timing coincides with a rendering start time of the graphics indicator, and display cycles are adjusted to one frame time T (=1/60 seconds, for example). In addition, it is assumed that the motor 8b is a stepping motor.

Note that the stepping motor is a motor that can be driven in a range with conditions where step losses do not occur, while grasping the amount of rotation without adding a rotation sensor. Here, as the conditions where step losses do not occur, upper and lower limit values such as a highest rotational speed +/−V and a highest rotational acceleration +/−A are provided using predetermined positive values A and V, and driving is performed in this range.

A drive speed determiner 20 performs a process for each rendering start time which is a display cycle T. A process performed during one cycle will be described below.

The drive speed determiner 20 accepts, as input, the current rotational position (current position) $x_0$ of the short hand 8a from a position detector 22, 22A. The drive speed determiner 20 further accepts, as input, a rotational speed v of an indication which is output in the last cycle, from a rotational speed detector 23, as the current rotational speed $v_0$. The drive speed determiner 20 determines a rotational speed $v_c$ of an indication using a predetermined value K, according to the following equation (1) using a target rotational position $x_i$ for the rendering start time and the current rotational position $x_0$ for the rendering start time. Note that when the rotational speed $v_0$ of the indication exceeds the highest rotational speed +/−V, it is restricted to the highest rotational speed +/−V.

$$v_c = V (V < K(x_i - x_0))$$

$$v_c = K(x_i - x_0) (-V \leq K(x_i - x_0) \leq V)$$

$$v_c = -V (K(x_i - x_0) < -V) \qquad (1)$$

In the above-described equation (1), feedback control is performed so as to reduce the deviation of the rotational position of the short hand 8a while restricting vc to a range that does not exceed +/−V. Furthermore, the rotational speed v of the indication with a restricted rotational acceleration is determined according to the following equation (2):

$$v = v_0 + A*T (A < (v_c - v_0)/T)$$

$$v = v_c (-A \leq (v_c - v_0)/T \leq A)$$

$$v = v_0 - A*T ((v_c - v_0)/T < -A) \qquad (2)$$

In the above-described equation (2), the rotational acceleration of the short hand 8a is regarded as $(v_c - v_0)/T$, and this value is restricted to a range that does not exceed +/−A.

A drive signal generator 21 generates and outputs a drive signal with a frequency proportional to the rotational speed v of the indication, and thereby drives the stepping motor 8b at this rotational speed v. The rotational speed v of the indication is reflected immediately after being computed.

In addition, the position detector 22 outputs the rotational position $x_0$ obtained at the rendering start time, to the hand position estimator 4. In addition, the rotational speed detector 23 outputs the rotational speed v calculated at the last rendering start time, as the current rotational speed $v_0$ for the rendering start time, to the hand position estimator 4. Note that the current rotational position $x_0$ and the current rotational speed $v_0$ are output as the current drive state to the hand position estimator 4.

As shown in FIG. 4(a), the position detector 22 detects a hand position (current rotational position $x_0$) by measuring the number of pulses and phase of the drive signal generated by the drive signal generator 21.

In addition, as shown in FIG. 4(b), the position detector 22A may calculate the hand position (current rotational position $x_0$) by adding up the rotational speeds v of the indication.

Note that, since the vehicle is being stopped when power is turned on, the target rotational position $x_i$, the current rotational position $x_0$, the rotational speed v of the indication, and the current rotational speed $v_0$ are all initialized to zero.

Now, description goes back to the flowchart of FIG. 3(a).

When the hand drive controller 2 outputs the drive signal at step ST4, the short-hand driver 8 receives the drive signal. Based on the drive signal, driving of the short hand 8a is controlled. On the other hand, after step ST4, it is determined at step ST5 whether the graphics indicator is being rendered (step ST5). Here, when power is turned on, a rendering state of FIG. 3(b) is initialized to "rendered". Therefore, at step ST5 performed for the first time, it is determined that the renderer 5 has already rendered a graphics indicator (step ST5; NO), and processing transitions to a process at step ST6.

At step ST6, based on the rendering information obtained from the rendering information storage 10 at step ST2, the display time estimator 3 estimates the display time at which the rendering information including the graphics indicator is displayed on the display screen 7a (step ST6).

When the display time estimator 3 estimates the display time, the hand position estimator 4 estimates the position of the short hand 8a for the display time, based on the drive state output from the hand drive controller 2 and the display time output from the display time estimator 3 (step ST7). Note that it is assumed that operation timing of the hand drive controller 2 coincides with rendering timing of the renderer 5.

After this, the renderer 5 starts rendering according to a rendering start request (step ST8). Thereafter, the flowchart of FIG. 3(a) returns to step ST1, and the renderer 5 is placed in a standby state until the next rendering start time. Note that if it is determined at the above-described step ST5 that the rendering is being performed (step ST5; YES), too, likewise, the flowchart returns to step ST1.

When a rendering start request is received at step ST8 of FIG. 3(a), rendering is performed based on the flowchart of FIG. 3(b).

FIG. 3(b) is activated when power is turned on, and the apparatus maintains a standby state until receiving the rendering start request made at step ST8 of FIG. 3(a) (step ST101; NO). When the rendering start request made at step ST8 of FIG. 3(a) is received (step ST101; YES), the rendering state is set to "being rendered" (step ST102). Note that, as described above, the rendering state is set to "being rendered" in a process (not shown) when power is turned on.

Subsequently, the renderer 5 accepts, as input, the rendering information and the above-described hand position estimated by the hand position estimator 4, and performs rendering of graphics in a framebuffer shown in FIG. 5, according to the rendering information (step ST103).

At this time, the renderer 5 performs rendering such that the graphics indicator which operates integrally with the short hand 8a in the rendering information is displayed in the above-described hand position estimated by the hand position estimator 4. When the rendering is completed, the renderer 5 sets the rendering state to "rendered" (step ST104).

Figure 5:
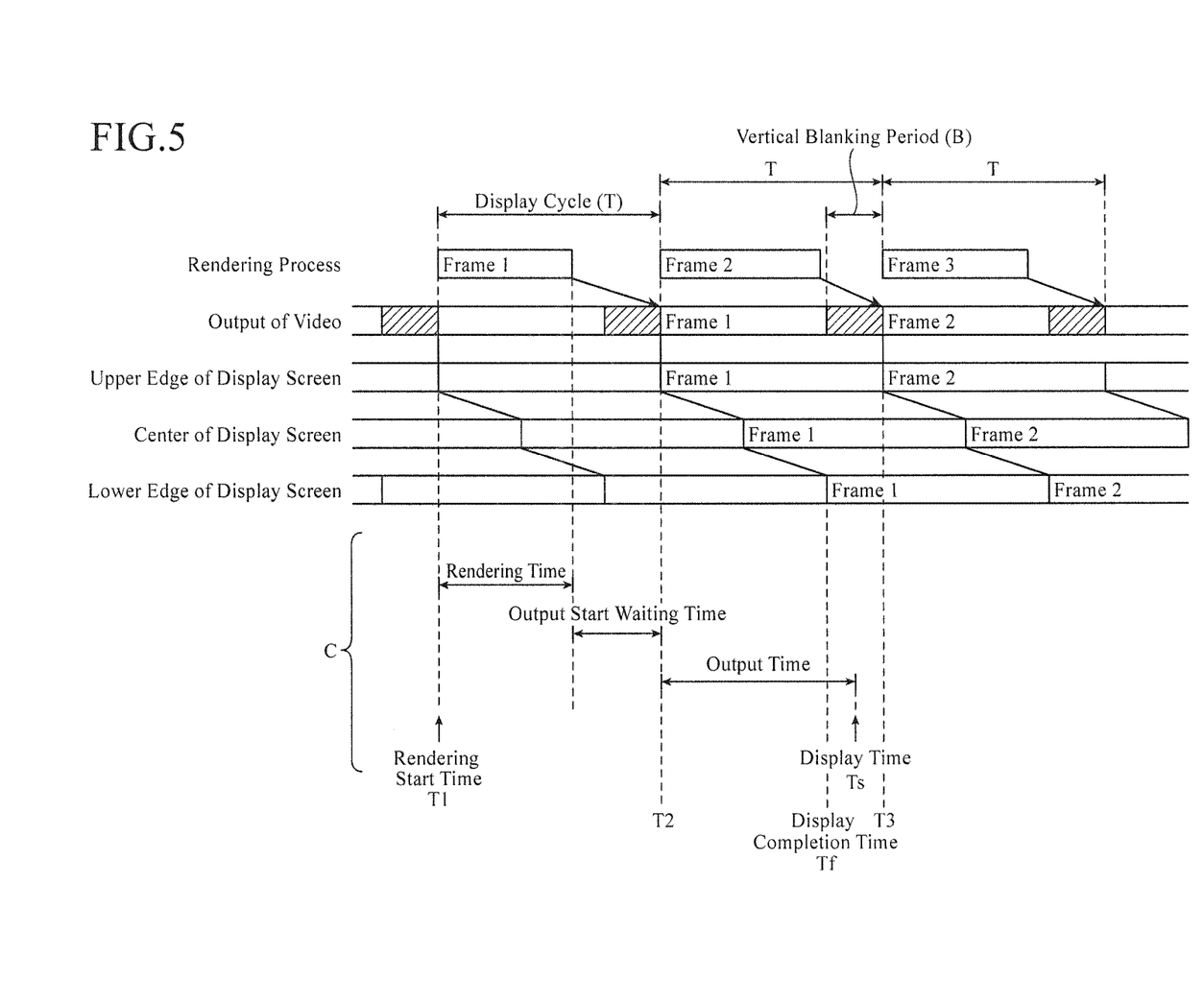
FIG. 5 is a timing chart showing an example of a process to the point where a graphics indicator is displayed, of the first embodiment of the invention.

FIG. 5 is a timing chart showing an example of a process to the point where the graphics indicator is displayed. A case will be described in which a framebuffer is prepared as the VRAM and rendering is performed, and rendering content in the framebuffer to be output is output and displayed by a scheme in which the rendering content is switched during a vertical blanking period (B).

In FIG. 5, the operation performed during a period from the rendering start time to the display time is described using the timing chart.

First, rendering time indicated by frame 1 is an amount of time required to render the rendering information obtained at step ST2 of FIG. 3(a) in the VRAM at step ST103 of FIG. 3(b). This is a period represented as the rendering time from the rendering start time in FIG. 5. For a procedure of obtaining this rendering time, for example, required rendering time is computed or measured for each rendering part in advance and held in a list, and rendering content is specified by a combination of the rendering parts.

For a rendering part whose rendering time changes due to a change in rendering area by the position of the pointer, such as the belt-like display 7f shown in FIG. 2(b), the required rendering time which is determined according to the indication value is held, and required rendering time of the rendering part is determined according to the input indication value. At this time, since the input indication value is close to the hand position determined by the hand position estimator 4, but is a different value, maximum rendering time in a predetermined range with the indication value at the center is determined to be the required rendering time of the rendering part.

Note that, when arbitrary characters are rendered, since the rendering time varies depending on the character, the required rendering time for a character that requires the largest amount of time for rendering conditions (font, size, transparency level, decoration, etc.) is held in a list.

In addition, rendering time for each frame is calculated by obtaining, from the above-described list, required rendering time for each rendering part included in rendering content of the frame, and adding up the required rendering time.

The display time estimator 3 calculates a display time according to the following equation (3). Note, however, that output start waiting time is, as shown in FIG. 5, waiting time from when writing of the rendering information to the VRAM is finished with the rendering start time as a start point, until output of the frame starts. Timing at which the output starts coincides with timing at which the next rendering start time comes.

$$\text{Display time} = \text{Rendering Start Time} + \text{Rendering Time} + \text{Output Start Waiting Time} + \text{Output Time} \quad (3)$$

In the example of FIG. 5, although a vertical blanking period (B) is normally on the order of several percent of the display cycle (T), in FIG. 5 for the sake of understanding technical content, the vertical blanking period is shown to be larger than the actual ratio of the timing chart.

For output of each frame image from the framebuffer, output is sequentially performed row-by-row in a horizontal direction from an upper-left edge to a lower-right edge of the display screen 7a, and this is performed over a period with a length T−B. In FIG. 5, in video output, this period is represented as a band such as frame 1, and a left end of the band corresponds to timing at which an upper edge of the display screen is output, and a right end of the band corresponds to output timing of a lower edge of the display screen.

When the display is one that performs continuous display such as a liquid crystal display, display of each frame is continued for a period with a length T which is defined from timing at which, for each line in an up-down direction, the line of a video signal is input and then display starts, to timing at which the line for the next frame is input.

In FIG. 5, this process is shown for the upper edge, center, and lower edge positions as representative positions of the display screen 7a, and a process where display is updated and continued is represented as a band such as frame 1.

Note that in FIG. 5 although there is an amount of delay corresponding to about one line between output of a frame and display of the line, since the delay is sufficiently small for the cycle T and affects very little, the delay is not shown.

In FIG. 5, the symbol C indicates a process from rendering start time T1 to appearing of the display screen 7a on the screen for frame 1. Display of the same frame is continued for the period of the cycle T for each of the upper edge, center, and lower edge positions of the display screen 7a of the display 7, and they are displayed from the upper edge to the lower edge, requiring substantially the period T.

In FIG. 5, the symbol C indicates a process that progresses from rendering to display for frame 1. For frame 1, a rendering process is performed at rendering start time T1, and after going through the output start waiting time, output starts at time T2. Display of frame 1 for the upper edge of the display screen 7a starts substantially simultaneously with a start of output T2. Output is sequentially performed from the upper edge to lower edge of the display screen. Display of frame 1 for the lower edge of the display screen 7a starts at time T3-B, and immediately thereafter, display of the entire frame 1 is completed. This time is display completion time Tf.

After the display of frame 1 is completed on the display screen 7a, at time T3 the display is updated to display of next frame 2 at the upper edge of the display screen 7a.

A period during which complete display of frame 1 is performed is between display completion time Tf of frame 1 and time T3 at which the display of frame 2 starts. Hence, in FIG. 5, output time is shown with the center between Tf and T3 being set as display time Ts.

Description has been made so far ignoring response delay of a liquid crystal display, i.e., an amount of time from timing at which display starts until the display is actually changed. However, instead of setting the center between Tf and T3 as display time Ts, as shown in FIG. 5, by setting, as display time Ts, a time that is obtained by adding response delay according to the display to Tf, the response delay can be handled.

When the center between Tf and T3 is set as a display time as shown in FIG. 5, output time=T−B/2. In addition, when, as shown in FIG. 5, the rendering start time is the display start time of the frame, an amount of time obtained by adding the output start waiting time to the rendering time is an amount of time where the rendering time is rounded up to a unit of the cycle T. Namely, assuming that the rendering time is completed within n cycles (n is an integer), the display time is represented by the following equation (4). The display time estimator 3 estimates the display time using this equation (4).

$$\text{Display time} = \text{Rendering start time} + (n+1-B/2)*T \qquad (4)$$

Note that, when n>1, all frames cannot be updated and thus in a frame that is not updated, the same graphics as the last one are output and thus synchronization cannot be achieved with the operation of the short hand 8a. Therefore, in the invention, it is assumed n≤1.

In addition, the graphics rendering may be performed not only by the above-described scheme using a framebuffer, but also by a rendering scheme in which rendering and outputting are performed one by one in real time using a line buffer. In this case, the rendering time and the output start waiting time are, for example, on the order of several lines and thus are sufficiently small for the cycle T. Thus, by setting n=0 in the above-described equation (4), the rendering scheme can be handled.

When the display time estimator 3 estimates the display time, the hand position estimator 4 estimates the position of the short hand 8a for the display time (step ST7).

The hand position estimator 4 obtains the drive state (current rotational position $x_0$ and current rotational speed $v_0$) which is determined by the hand drive controller 2. With respect to a current time $t_0$ and a specified time t, a hand position $x_t$ for the time t can be estimated according to the following equation (5):

$$x_t = x_0 + (t-t_0)v_0 \qquad (5)$$

In the above-described equation (5), with a combination with the above-described drive speed determiner 20, a hand position can be accurately estimated for a time up to Rendering Start Time+T. However, times after that time have approximate values including errors.

A display time for when rendering is performed within one frame is represented by Rendering Start Time+2T−B/2 (when n=1 in equation (4)), and is in a range of approximate values exceeding Rendering Start Time+T. If the values of cycle T and acceleration A are small, this approximate error can be ignored.

On the other hand, when this error cannot be ignored, approximation can be performed according to the following equation (6) where acceleration is considered constant, further using the drive state (rotational speed $v_{-1}$) of the immediately preceding cycle.

$$x_t = x_0 + T*v_0 + (t-t_0-T)(2v_0-v_{-1}) \qquad (6)$$

After this, the renderer 5 determines, at step ST101, the rendering start request made at step ST8, and sets the rendering state to "being rendered" (step ST102).

Subsequently, the renderer 5 accepts, as input, the rendering information and the above-described hand position estimated by the hand position estimator 4, and performs rendering of graphics in the framebuffer according to the rendering information (step ST103).

At this time, when the renderer 5 finds, in the rendering information, a rendering part of the graphics indicator 7b (or 7f) which operates integrally with the short hand 8a, it performs rendering such that the graphics indicator 7b (or 7f) is displayed in the above-described hand position estimated by the hand position estimator 4. When the rendering is completed, the renderer 5 sets the rendering state to "rendered" (step ST104).

The video signal generator 6 generates the video signal in which the frame is updated every rendering cycle T, and outputs the video signal to the display 7. When rendering by the renderer 5 is completed at output start timing of each frame, i.e., when the rendering state is "rendered", the video signal generator 6 switches the output to output of a newly rendered frame instead of the frame having been output so far. In addition, at this timing, the timing control signal is generated and processes from step ST1 start.

Note that in the above-described processes of the hand drive controller 2 and the hand position estimator 4, when rendering is performed within one frame, the hand position for Display Time=Rendering Start Time+2T−B/2 (when n=1 in equation (4)) becomes assumption by approximation.

Hence, instead of the hand drive controller 2 outputting a drive signal promptly, a change may be made such that the drive signal is output at the start of the next display cycle. In this case, a drive state output from the hand drive controller 2 includes a current rotational position $x_0$, a rotational speed $v_0$ of an indication which is calculated last time and output from now, and a rotational speed $v_1$ of an indication which is calculated this time and output next time.

By doing so, control delay increases and thus a control response of the hand drive control is degraded; however, the hand positions for times up to Rendering Start Time+2T can be accurately estimated.

In this case, the hand position estimator 4 calculates the hand position according to the following equation (7):

$$x_t = x_0 + (t - t_0)v_1 \quad (t_0 \le t < t_0 + T)$$

$$x_t = x_0 + T*v_0 + (t - t_0 - T)v_1 \quad (t_0 + T \le t) \quad (7)$$

As described above, according to the first embodiment, there is provided the renderer 5 that renders the graphics indicator which is displayed on the display screen 7a of the display 7 and which indicates the indication value by operating integrally with the short hand 8a. By such a configuration, the display screen 7a can be effectively utilized while the highly-reliable indication function of the mechanical meter is ensured. In addition, even when the meter is reduced in size and displayed, by adding the belt-like display 7f, visibility can also be ensured.

In addition, according to the first embodiment, there are provided the display time estimator 3 that estimates the display time at which the graphics indicator is displayed; and the hand position estimator 4 that estimates the position of the short hand 8a for the display time estimated by the display time estimator 3. The renderer 5 renders the graphics indicator in the position of the short hand 8a which is estimated by the hand position estimator 4. By such a configuration, the graphics indicator can operate in synchronization with the short hand 8a.

Furthermore, according to the first embodiment, the graphics indicator 7b is the hand-like graphics indicator extending from the end of the short hand 8a. By displaying such a graphics indicator in synchronization with the short hand 8a, the same visibility as that of a conventional mechanical meter with a long hand can be ensured.

Second Embodiment

Figure 6:
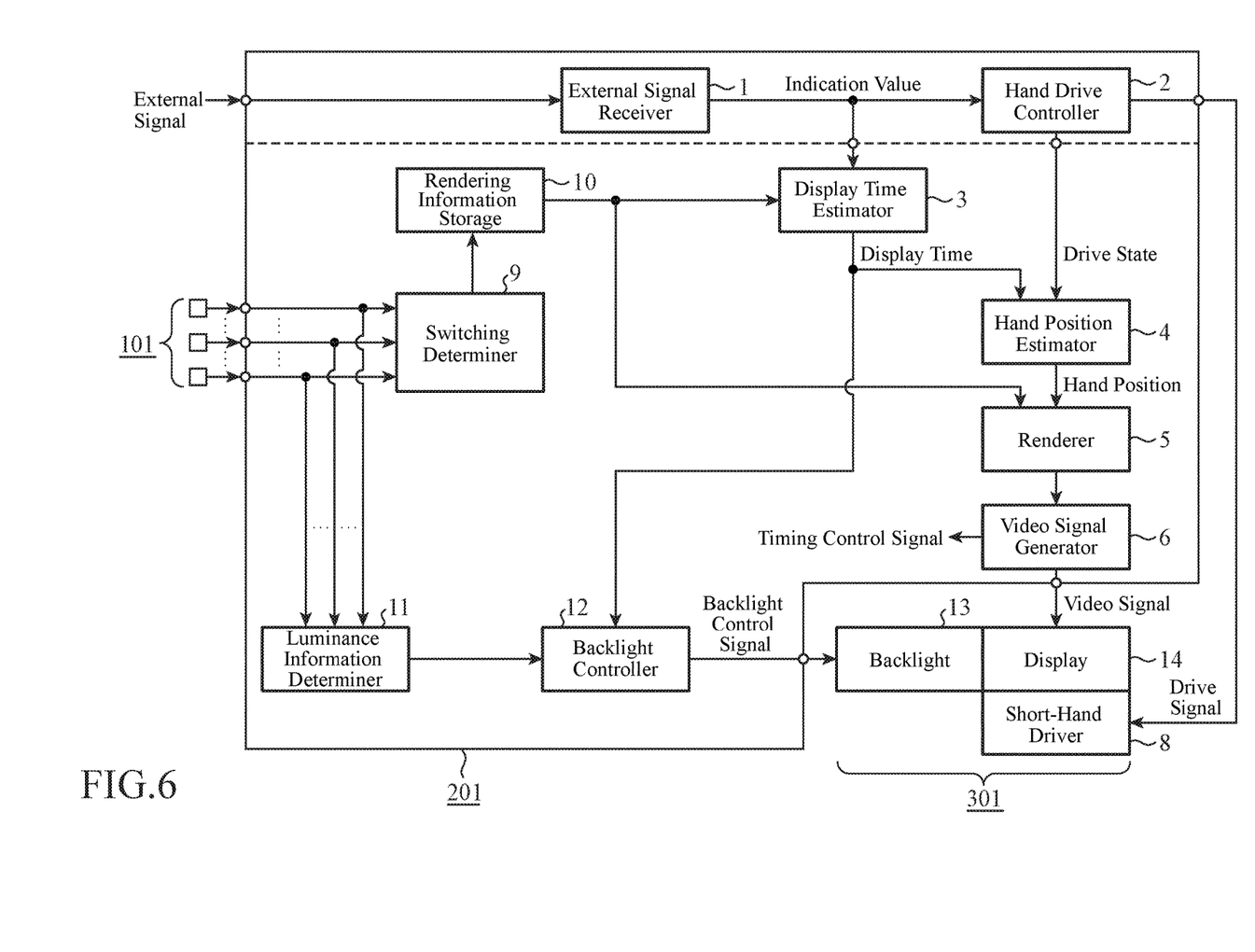
FIG. 6 is a block diagram showing a configuration of a meter system according to a second embodiment of the invention.

FIG. 6 is a block diagram showing a configuration of a meter system according to a second embodiment of the invention. FIGS. 7(a) and 7(b) are timing charts showing examples of a backlight control signal. In FIG. 6, configurations denoted by the same reference sings as those of FIG. 1 are the same or corresponding components and thus description thereof is omitted. The meter system shown in FIG. 6 is a system that allows a meter indicating a state of a vehicle to operate, as in the above-described first embodiment. The meter is composed of a short hand 8a and display 14 having a display screen 7a disposed on the back of the short hand.

As shown in FIG. 6, the meter system of the second embodiment is composed of sensors 101 for grasping vehicle status; a display control apparatus 201 that controls display of the display according to the vehicle status; and an information presentation apparatus 301 that presents information in response to an instruction from the display control apparatus 201. Here, the information presentation apparatus 301 includes the display 14 including the display screen 7a and a backlight 13. In addition, the information presentation apparatus 301 includes a short-hand driver 8 including the short hand 8a and a driver that drives the short hand 8a.

The second embodiment differs from the first embodiment in that vehicle status is grasped from the sensors 101, and intermittent lighting control of the backlight 13 is performed according to the vehicle status. In the second embodiment, the intermittent lighting control of the backlight 13 has roughly two meanings.

The first one is that, by displaying the backlight 13 only for a predetermined period including a display time, it becomes difficult for a driver to visually identify a lag between the short hand 8a and a graphics indicator, suppressing a feeling of strangeness. Namely, as described in detail in the first embodiment, display where the graphics indicator and the short hand 8a are synchronized with each other is completed at a display time, but since this display is continued until display of the next frame starts, the graphics indicator is viewed with lagging behind the short hand 8a.

Therefore, when only display where both of the short hand and graphics indicator are synchronized with each other is lighted with the backlight 13 to be shown to the driver, it is possible not to allow the driver to notice a lag between both of them.

The second one is that, by changing the ratio of a lighting period of the backlight 13, the brightness of the display screen 7a can be changed. Therefore, when the sensors 101 find that it is difficult to view the display screen 7a due to the entry of external light to the display screen 7a, the ratio of the lighting period of the backlight 13 is increased to brighten the screen, by which visibility can be improved. In addition, in contrast, when driving at night, the ratio of the lighting period of the backlight 13 is reduced to turn down the screen brightness (luminance) of the display screen 7a, by which the driver can be prevented from seeing visions. In conditions such as cloudiness, the ratio of the lighting period of the backlight 13 is slightly reduced, by which driver's visibility can be increased. Note that the ratio of the lighting period of the backlight 13 may be changed in a stepwise manner, or may be changed continuously according to vehicle status.

The display 14 is a liquid crystal display that performs display by illumination with the backlight 13 from the back side of the display screen 7a. A backlight controller 12 is a controller that controls lighting of the backlight 13, and performs intermittent lighting of the backlight 13 of the display 14 such that lighting timing coincides with the display time estimated by a display time estimator 3. Specifically, the backlight controller 12 accepts, as input, the display time estimated by the display time estimator 3, generates, as shown in FIG. 7(a), a lighting pulse signal having predetermined durations with the display time at the center, and outputs the lighting pulse signal as a backlight control signal to the backlight 13. The backlight 13 is turned on with the pulse widths of the backlight control signal.

In the liquid crystal display, display of each frame is continued for one frame, and thus, graphics with motion may be viewed misaligned. In particular, in the invention, a mismatch may occur between the short hand 8a which is continuously driven and graphics which do not move during one frame. Accordingly, there is a possibility that the driver may notice the misalignment.

Hence, in the second embodiment, intermittent lighting is performed such that the backlight 13 is turned on around the display time estimated by the display time estimator 3. By doing so, the backlight 13 is turned off during a period during which the positions of the graphics indicator and the short hand 8*a* deviate from each other, and the backlight 13 is turned on around a time at which the graphics indicator and the short hand 8*a* match each other. Therefore, the above-described graphics misalignment is reduced, and the display screen 7*a* can be displayed when the graphics indicator matches the hand position of the short hand 8*a*.

Figure 7:
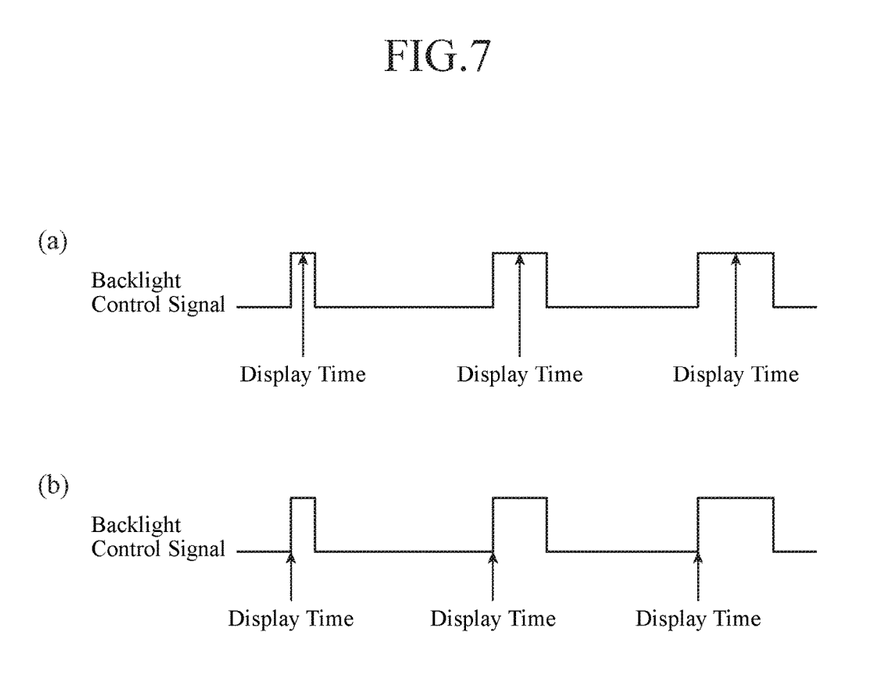
FIGS. 7(a) and 7(b) are timing charts showing examples of a backlight control signal of the second embodiment of the invention.

Note that, graphics for one frame are output from a VRAM and display is completed at the display time, and thus, as shown in FIG. 7(*b*), the backlight controller 12 may output the backlight control signal (lighting pulse signal) to the backlight 13 such that rise timing of the backlight control signal (lighting pulse signal) coincides with the display time. By doing so, graphics that are in the course of being output from the VRAM are not displayed, enabling to ensure the visibility of the graphics indicator.

As described above, according to the second embodiment, the display 14 is a liquid crystal display, and there is provided the backlight controller 12 that performs intermittent lighting of the backlight 13 of the liquid crystal display such that lighting timing coincides with the display time estimated by the display time estimator 3. By such a configuration, the misalignment of the graphics indicator is reduced, enabling to improve the degree of matching between the graphics indicator and the hand position of the short hand 8*a*.

Note that in FIG. 7(*a*), when the backlight lighting width is increased, it may look like the backlight 13 is turned on in the middle of display, but in practice the display is almost done and thus the driver does not notice it.

In the second embodiment, in FIG. 6, information from the sensors 101 is input to a switching determiner 9 as in the first embodiment, and is, on the other hand, provided to a luminance determiner 11. The luminance determiner determines the vehicle status as with the switching determiner 9. Here, the luminance determiner 11 determines particularly a peripheral environment related to luminance. A result of the determination is provided to the backlight controller 12 and used for intermittent lighting control of the backlight.

In addition, in FIGS. 7(*a*) and 7(*b*), backlight control signals are such that the lighting period of the backlight is longer as going toward the right side compared to the left side, to increase the ratio of the lighting period of the backlight.

How the lighting period ratio of the backlight is set is determined by the above-described luminance determiner 11, and intermittent lighting control is performed so as to obtain appropriate luminance according to the vehicle status.

Note that, when luminance adjustment of the display screen 7*a* is not required, the luminance determiner 11 is not necessary.

Note that, in the invention, free combination of any of the embodiments, or modifications to any component of the embodiments, or omissions of any component in the embodiments which come within the true spirit and scope of the invention may be made.

INDUSTRIAL APPLICABILITY

A meter control apparatus according to the invention can effectively utilize a display screen while ensuring a mechanical indication function and visibility of a meter, and thus, is suitable for an integrated instrumental panel meter.

DESCRIPTION OF REFERENCE NUMERALS AND SIGNS

1: EXTERNAL SIGNAL RECEIVER, 2: HAND DRIVE CONTROLLER, 3: DISPLAY TIME ESTIMATOR, 4: HAND POSITION ESTIMATOR, 5: RENDERER, 6: VIDEO SIGNAL GENERATOR, 7 and 14: DISPLAY, 7*a*: DISPLAY SCREEN, 8: SHORT-HAND DRIVER, 8*a*: SHORT HAND, 8*b*: MOTOR, 9: SWITCHING DETERMINER, 10: RENDERING INFORMATION STORAGE, 11: LUMINANCE DETERMINER, 12: BACKLIGHT CONTROLLER, 13: BACKLIGHT, 20: DRIVE SPEED DETERMINER, 21: DRIVE SIGNAL GENERATOR, 22 and 22A: POSITION DETECTOR, 23: ROTATIONAL SPEED DETECTOR, 100 and 101: SENSOR, 200 and 201: DISPLAY CONTROL APPARATUS, and 300 and 301: INFORMATION PRESENTATION APPARATUS

The invention claimed is:

1. A display control apparatus that controls display of a display having a configurable image display screen disposed on a back of a meter, the meter having a mechanically driven pointer representing a value to be displayed, the display control apparatus comprising:
   a renderer to render a graphics indicator indicating an indication value of the meter provided in synchronization with the pointer so as to enhance the display of the value represented by the pointer, the graphics indicator being displayed on the display screen of the display;
   a switching determiner to determine vehicle status based on an output from a sensor to determine a rendering mode of the display screen,
   a display time estimator to estimate a display time at which the graphics indicator is displayed; and
   a hand position estimator to estimate a position of the pointer for the display time estimated by the display time estimator, wherein
   the renderer changes a display mode of the graphics indicator displayed on the display screen, according to the rendering mode determined by the switching determiner, and renders the graphics indicator to indicate the indication value in synchronization with the position of the pointer estimated by the hand position estimator to thereby enhance the display of the value represented by the pointer.

2. The display control apparatus according to claim 1, wherein
   the display can perform display by receiving backlight light, and
   the display control apparatus comprises a backlight controller to perform intermittent lighting of a backlight of the display such that the backlight is turned on at the display time.

3. The display control apparatus according to claim 2, further comprising a luminance determiner to determine the vehicle status based on an output from the sensor to determine luminance of the display screen, wherein
   the backlight controller adjusts a ratio of a lighting period with respect to a control cycle of the backlight so as to obtain the luminance determined by the luminance determiner, and performs intermittent lighting such that the lighting period is within a vertical blanking period.

4. The display control apparatus according to claim 1, wherein the graphics indicator is graphics that display a rotation path of the pointer in a belt-like manner.

5. The display control apparatus according to claim 1, wherein the graphics indicator is hand-like graphics extending from an end of the pointer.

6. A meter system comprising:
   a meter having a mechanically driven pointer representing a value to be displayed:
   a hand drive controller to drive the meter;
   a display having a configurable image display screen disposed on a back of the meter; and
   a display control apparatus to control the display screen of the display, wherein
   the display control apparatus includes:
      a renderer to render a graphics indicator indicating an indication value of the meter provided in synchronization with the pointer so as to enhance the display of the value represented by the pointer, the graphics indicator being displayed on the display screen of the display; and
      a switching determiner to determine vehicle status based on an output from a sensor to determine a rendering mode of the display screen,
      a display time estimator to estimate a display time at which the graphics indicator is displayed; and
      a hand position estimator to estimate a position of the pointer for the display time estimated by the display time estimator, wherein
   the renderer changes a display mode of the graphics indicator displayed on the display screen, according to the rendering mode determined by the switching determiner, and renders the graphics indicator to indicate the indication value in synchronization with the position of the pointer estimated by the hand position estimator to thereby enhance the display of the value represented by the pointer.

7. A display control method for controlling display of a display having a configurable image display screen disposed on a back of a meter, the meter having a mechanically driven pointer representing a value to be displayed, the display control method comprising:
   rendering, by a renderer, a graphics indicator indicating an indication value of the meter provided in synchronization with the pointer so as to enhance the display of the value represented by the pointer, the graphics indicator being displayed on the display screen of the display;
   determining, by a switching determiner, vehicle status based on an output from a sensor to determine a rendering mode of the display screen;
   estimating, by a display time estimator, a display time at which the graphics indicator is displayed; and
   estimating, by a hand position estimator, a position of the pointer for the display time estimated by the display time estimator, wherein
   changing, by the renderer, a display mode of the graphics indicator displayed on the display screen, according to the rendering mode determined by the switching determiner, and rendering the graphics indicator to indicate the indication value in synchronization with the position of the pointer estimated by the hand position estimator to thereby enhance the display of the value represented by the pointer.

* * * * *